United States Patent [19]
Hewitt et al.

[11] Patent Number: 4,642,806
[45] Date of Patent: Feb. 10, 1987

[54] COMMUNICATIONS NETWORK HAVING A SINGLE NODE AND A PLURALITY OF OUTSTATIONS

[75] Inventors: Michael T. H. Hewitt; John W. Ballance, both of Ipswich; Richard P. I. Scott, Woodbridge, all of England

[73] Assignee: British Telecommunications Public Limited Company, Great Britain

[21] Appl. No.: 647,441

[22] Filed: Sep. 5, 1984

[30] Foreign Application Priority Data

Sep. 7, 1983 [GB] United Kingdom ............... 8323967
Oct. 14, 1983 [GB] United Kingdom ............... 8327586

[51] Int. Cl.$^4$ ............................................. H04J 3/02
[52] U.S. Cl. ........................................ 370/95; 455/54; 370/103; 370/104
[58] Field of Search ................. 370/104, 93, 95, 103; 455/11, 12, 13, 51, 54; 375/107

[56] References Cited

U.S. PATENT DOCUMENTS

| | | |
|---|---|---|
| 3,654,390 | 4/1972 | Puckette . |
| 3,654,395 | 4/1972 | Schmidt . |
| 3,936,601 | 3/1976 | Obeginski . |
| 4,065,639 | 12/1977 | Suzuki et al. . |
| 4,470,141 | 9/1984 | Takada ............................. 370/104 |
| 4,472,802 | 9/1984 | Pin et al. .......................... 370/104 |

FOREIGN PATENT DOCUMENTS

| | | |
|---|---|---|
| 0069275 | 6/1982 | European Pat. Off. . |
| 0088647 | 10/1983 | European Pat. Off. . |
| 2180988 | of 1973 | France . |
| 1031686 | 8/1963 | United Kingdom . |

OTHER PUBLICATIONS

ICC'83 Conference Record of the International Conference on Communications, Boston, Mass., 19th–22nd Jun. 1983, vol. 1, pp. B2.5.1–B2.5.7, IEEE New York, US M. Murkami et al., "A Multiple Access Digital Microwave Radio System for Local Subscribers' p. B2.5.3 paragraph 11.2.

Electronics International, vol. 55, No. 26, 29th Dec. 1982, pp. 71–75, New York US; W. E. Day: "Meteor–Burst Communications Bounce Signals Between Remote Sights." Figure 2.

ICC'81 Conference Record of the International Conference on Communications, Denver, Colorado, 14th–18th Jun. 1981, vol. 3, pp. 66.1.1–66.1.5, IEEE, New York, US S. Shindo et al.: "Radio Subscriber Loop System for Highspeed Digital Communications" p. 66.1.4 Left hand column.

Patent Abstracts of Japan, vol. 7 No. 115 (E-176) (1260), 19th May 1983 & JP-A-58 36034 (Nippon Denshin Denwa Kosha) 02-03-1983.

ICC'83 Conference Record of the International Conference on Communications, vol. 2, Jun. 19–22 1983, Boston Mass. IEEE New York (US) Y. Manichaikul et al. "RAPAC-A Point-to-Multipoint Digital Radio System for Local Distribution" pp. D4.2.1–D4.2.4 p. D.4.2.3, right hand column.

*Primary Examiner*—Douglas W. Olms
*Attorney, Agent, or Firm*—Nixon & Vanderhye

[57] ABSTRACT

In a time division multi-access communications system each burst in each slot commences with a preamble and the clocks used to control the sequence of operations are synchronized by means of these preambles. In particular the outstations control their transmissions to the node by timing pre-set delays from the receipt of the preamble. In a preferred embodiment the pre-set delays are adjusted by signals from the node so that bursts arrive at the node in correct sequence.

25 Claims, 8 Drawing Figures

COMMUNICATIONS NETWORK HAVING A SINGLE NODE AND A PLURALITY OF OUTSTATIONS

This invention relates to a communications system in which a plurality of outstations use a single node as an intermediate for their communications. The system uses two channels, e.g. two radio channels, both of which are used in a time-share mode.

According to this invention communication between a single node and a plurality of outstations is carried out using two communication channels, e.g. two radio channels of different frequency, one of said channels being used for communication from the node to all the outstations and the other of said channels being shared by all the outstations for communication to the node; characterised in that said communication, in both directions, takes the form of a sequence of traffic bursts wherein each traffic burst includes a marker for synchronisation. It is a particular feature of this invention that each of the active outstations utilises synchronisation markers only for its own bursts. On receipt of a burst an active outstation initiates a pre-set delay and it returns a burst to the node. The node has control of all the outstations and it adjusts each pre-set delay so that bursts received at the node are in the correct sequence.

The outstations require clocks which are used, in conjunction with the markers, to keep synchronisation. Thus the node has control of the synchronisation of the system because (a) all clocks are derived from a master clock at the node, (b) the phasing of the clocks is fixed by synchronisation markers transmitted by the node and (c) the pre-set delays are adjusted by the node.

The outstations are synchronised to transmit in turn. Since it is unwise to rely on perfect adjustment the synchronisation is designed with gaps to reduce the occurrence of overlaps. There will be large gaps when outstations do not wish to transmit (and there will be complete silence when no outstation wishes to transmit). Thus the reception at the node has a discontinuous burst structure.

The information bearing transmissions from the node have a similar discontinuous burst structure but clocks dependant on the node would cease to function during gaps and this could have an adverse effect on system performance. It is, therefore, desirable that the node generates a randomised pseudo-signal which is used to fill the gaps between information-containing bursts. Thus the transmission from the node has a discontinuous burst structure in respect of the information bearing content but the discontinuities are filled with timing signal whereby dependant clocks are kept in adjustment.

The system according to the invention is suitable for use at overall bit rates of 0.1 to 100 MHZ, e.g. 1 to 10 MHz with a frame period of 20 μs to 200 ms, especially 100 μs to 10 ms. From 2 to 2,000, e.g. 40–1,000 channels, each with its own interface, can be accommodated in a single system although not all the interfaces may be able to have simultaneous traffic access. Burst lengths in the range 1 μs to 1 ms are possible but lengths of 10 μs to 200 μs are more usual.

The invention, which is defined in the claims, includes:

(a) The method of operating the system.
(b) Terminals for use in the method.
(c) Nodes for use in the method.
(d) Interface circuits, adapted to co-operate with transmitters and receivers, to provide the functions of the method.

The invention will now be described by way of Example with reference to the accompanying drawings, in which.

Figure 1:
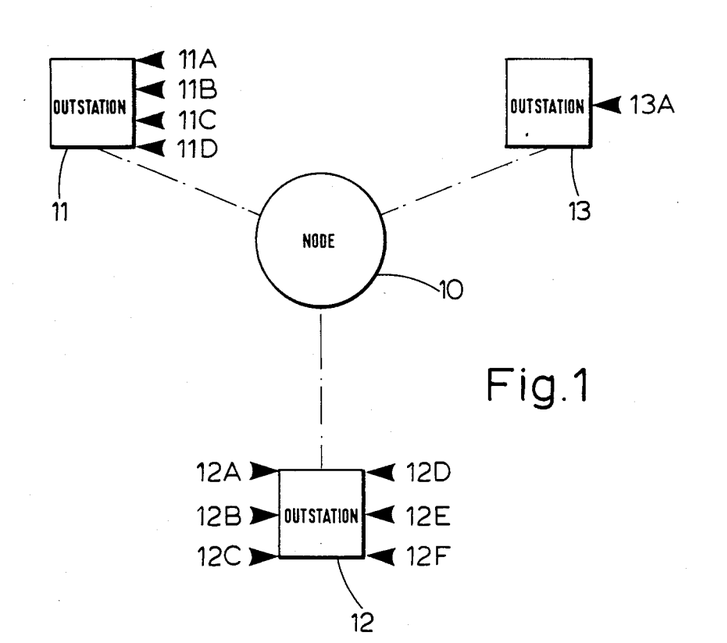
FIG. 1 illustrates a radio network showing a node and some outstations.

The multipoint radio system illustrated in FIG. 1 comprises a node which transmits to a plurality of outstations on one frequency and receives from all the outstations a different frequency. Each outstation is connected to, and provides service for one or more customers. A commercial system could provide service for up to 256 customers distributed among 50–70 outstations. (A greater number of outstations increases the cost thereof but decreases the distances between the outstations and their customers so reducing the costs of wiring. The optimum for any system is a compromise based upon the geographical distribution of the customers).

FIG. 1 shows three of the outstations (11, 12, and 13) in communication with a node 10. The outstations include interface circuits in the form of terminal cards each of which handles the traffic for a single customer. Outstation 11 has four terminal cards 11A–11D; outstation 12 has six terminal cards 12A–12F and outstation 13 has only one terminal card 13A. Clearly FIG. 1 does not indicate the full extent of a commmercial system but it makes the point that there are a plurality of outstations some, and perhaps all, of which serve a plurality of terminal cards. The terminal cards provide ports for the connection of external circuits, e.g. the circuits which provide circuits for customers.

The system operates in frames of about 10 ms duration and each frame consists of about 8000 bytes of which about 2000 are used for system information, i.e. 6000 are used for traffic. When transmitting, a customer would be allocated 100 bytes in each frame so that a maximum of 60 customers could use the system simultaneously. As stated above it is possible to connnect up to 256 customers to the system which means that, at most, only 20 percent of the customers can use the system at the same time. It therefore follows that idle customers cannot have access to traffic slots and a customer has to be allocated to a traffic slot on changing from an idle to an active state. The frame and slot structures used to operate the system will now be described.

Figure 2:
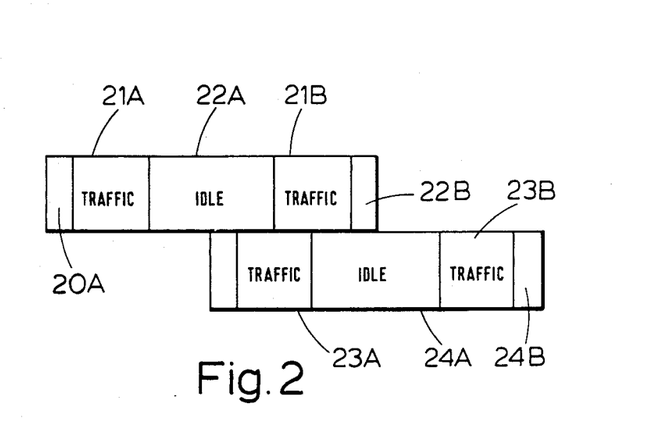
FIG. 2 illustrates the frame structure of the signal.

FIG. 2 shows certain fundamental features of the signals at the node and, specifically, it shows one outward and one inward frame. The structure repeats endlessly but the fundamental features are most conveniently seen by selecting one inward and one outward frame for comparison.

The outward frame has a duration of 10 ms with a maximum capacity of 8000 bytes, i.e. 64000 bits, in 10 ms or a bit rate of 6.4 MHz. The outward frame comprises 3 portions, namely an inital portion 20A which serves special functions for frame synchronisation. It is convenient to call this portion "slot zero". Slot zero lasts about 175 μs, and it contains 140 bytes. The remainder of the frame is denoted to traffic bursts and is divided into traffic segments 21A, 21B (which may contain several traffic bursts) intermixed with idle portions 22A, 22B (which may have room for several traffic bursts). The precise pattern will alter as customers begin and cease transmitting. However, the idle portions 22 are filled with a randomised pseudo signal so that the node maintains a continuous transmission. The outstations derive their clocks from the node's transmission and these would be lost if there were a break at the node. The pseudo-signal keeps the clocks going when there is no traffic.

The inward frame has a similar structure but there are important differences. It is commenced 5 ms, i.e. half a frame, after the start of the outward frame. The first difference relates to slot-zero which serves different functions in the inward direction. The remainder of the inward frame is identical to the outward frame but about 5 ms later. Traffic segments 23A, 23B occur about 5 ms after traffic portions 21A, 21B and idle portions 24A, 24B occur about 5 ms after idle portions 22A, 22B. It is emphasised that, in the inward frame, the idle portions are empty and there is not even carrier. In other words the inward frames have a discontinuous burst structure.

It is also emphasised that, because each burst originates from a different location, there are problems of synchronisation and perfect synchronisation is impossible. Thus it is necessary to leave room in the frame for synchronisation error and the allowance is about 700 μs, split into 61 gaps (i.e. 60 gaps between traffic bursts and one gap between slot-zero and a traffic burst). It will be apparent that the gaps are uneven because they are provided to allow for errors in synchronisation. Thus there is a standard gap of 10 μs so that individual timings can be out by ±5 μs without causing an error. Thus inward frames at the node comprise sequences of bursts with short gaps (e.g. about 10 μs) to allow for synchronisation errors and long gaps (e.g. more than 150 μs) when less than 60 customers are active.

Figure 3:
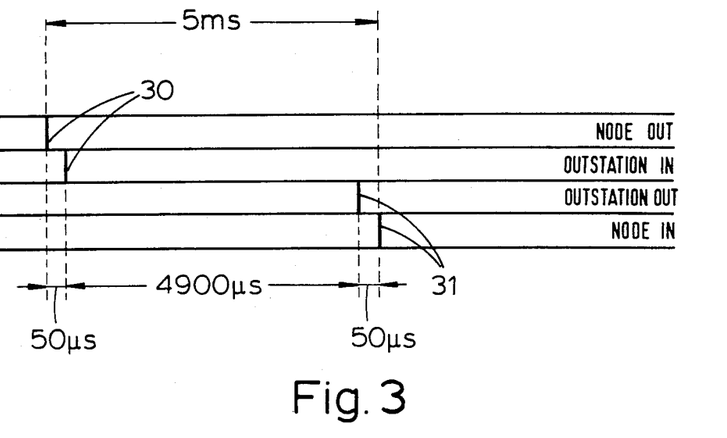
FIG. 3 illustrates timing relationships at the node and an outstation.

The frame structure and timing at an outstation are described in FIG. 3 which illustrates the slots between the node and one customer.

The top band of FIG. 3 shows a bursts or slot 30 transmitted by the node at intervals of 10 ms. Since the slot is about 1/61 of the frame it is shown as a single line. There is a delay before the slot 30 is received at its outstation and this delay is indicated in line 2 of FIG. 3. For an outstation at a range of 15 km the delay would be 50 μs (which is about 0.5 percent of a frame). The system can be used at longer ranges, up to the limit of line of sight, and delays longer than 50 μs are possible. The node receives slot 31, shown in the bottom line of FIG. 3, 5 ms after it sent slot 30. In order for this to happen the outstation sent slot 31, 50 μs earlier and this is shown in line 3 of FIG. 3. Thus the outstation sends slot 31 (4900±5) μs after it received slot 30. The result is that the interval at the node is (5000±5) μs. Each outstation operates in a similar way (but the delay of 4900 μs is adjusted to its range) so that the signals at the node do not overlap. The overall system is, therefore, as follows:

(a) The node sends a continous signal including a burst for each active customer;

(b) each customer recognises and selects its own incoming bursts and times a fixed delay, adjusted for range, from the start of each burst;

(c) at the end of the delay the customer transmits a burst to the node;

(d) the node receives all these bursts in order and in fixed time relation to its transmission as specified in (a). There are gaps between the bursts to allow for errors in adjustment.

The frame structure having been described it is necessary to consider the structure of the slots which compose the frame. Four different types of slots are used, namely:

(1) Timeslot zero for conveying system instructions from the node to the outstations and idle customers.

(2) Traffic slots for conveying traffic (in both directions) between the customers and node.

(3) Calling slots which convey traffic information from idle customers to the node and, in particular, are used for customers to request service.

(4) Ranging slots which pass from an idle customer to the node so that the node can check the synchronisation of the customer. If corrections are needed these are communicated as system information in timeslot zero.

Each of these slots will now be described. Fixed sequence are used for synchronisation and these will be defined in hexadecimal notation.

TIMESLOT ZERO

This consists of 140 bytes which are used as follows:
Bytes 1-3: are AAAAAA for clock run-in.
Bytes 4-6: are 7E7E7E to identify timeslot zero and to establish byte-sync when needed.
Byte 7: identifies the system. (System identification is incorporated in case, under freak conditions, a system nominally out-of-range is received. A mismatch in Byte 7 would indicate this).
Bytes 8-12: are spare.
Bytes 13-140: (i.e. 128 bytes) are available for sixteen system "messages" each of 8 bytes.

In this context "message" means an order to a customer relating to the system and each "message" is composed of two check-sums, in bytes 1 and 8, which confirm that the message is correct; if the check-sums indicate that the message is corrupt it is ignored. Byte 2 of the message contains the customer's address leaving 5 bytes for the content of the message. The use of the message will be explained below.

The information transmitted in timeslot zero can be regarded as a "system burst" because bytes 1-7 serve an important system function (even if other bytes are addressed to specific customers).

TRAFFIC SLOTS

A traffic slot comprises a nominal 131 bytes but this includes 8 bytes which constitute the gap left to allow for synchronisation error. This leaves 123 usable bytes which are allocated as:
Bytes 1-8: as preamble;
Bytes 9-16: as system "message";
Bytes 17-121: as traffic;
Bytes 122-123: as "spare" in case an outstation overruns.

The "preamble" consists of:
Bytes 1-3: as AAAAAA as clock run-in;
Bytes 4-6: as 818181 to identify a traffic slot and to establish byte-sync when needed;
Byte 7: for system identification;
Byte 8: as customer address.

Limiting the address to one byte limits the number of customers to 256; more customers could be accommodated with different arrangements. The "message" in bytes 9-16 has the same structure as in timeslot zero. In outward traffic slots (i.e. node to customer) spare bytes, e.g. bytes 122-131 are filled with pseudo-signals to keep outstation clocks in operation. In inward traffic slots (i.e. customer to node) spare bytes are empty and without carrier.

CALLING SLOT

This consists of 16 bytes used as follows:
Bytes 1-8: are the same as bytes 1-8 of a traffic slot;
Byte 9: checksum for bytes 10-12;
Bytes 10-12: "message";
Byte 13: byte 9 backwards;
Bytes 14-16: gap to allow for synchronisation error.

The calling slots go in the inward frames in the space equivalent to timeslot zero in the outward frames. Thus there is room for 8 such slots (which requires 128 bytes) with 12 bytes to spare, as additional gaps, to make up the 140 bytes used by timeslot zero.

The most important purpose of the calling slots is the institution of calls by customers. The customer is identified in byte 8 and a "calling sign" appears in bytes 10-12. On receipt of the calling sign the node takes action to establish the call. This calling is uncontrolled in that there is no system for preventing two customers calling in the same calling slot at the same time. Avoidance of clashes is left to chance. However, there are 8 calling slots in each frame and there are only 256 customers so the probability of complete failure due to fortuitous selection of coincident calling slots is negligible.

A controlled system has been considered as an alternative to random calling. However, the control would impose delays when none are required and it is considered preferable to accept a small probability of fortuitous coincidence.

RANGING SLOT

This is used so that the node can measure the effect of distance on the timing of incoming slots originating from each customer. The ranging slot is transmitted from outstation to node during the 140 bytes equivalent to timeslot zero in the outward direction. The slot is composed of:
Bytes 1-112: Empty (No carrier);
Bytes 113-120: Preamble (as bytes 1-8 of a traffic slot);
Bytes 121-122: Pattern to confirm "Ranging Slot";
Bytes 123-140: Empty (No carrier).

It should be noted that the ranging slot is mostly empty, i.e. 120 out of 140 bytes, because it is used when timing may be in substantial error.

The arrangement, suitable at the outstations, will now be described with reference to FIG. 4.

The outstation comprises an antenna 40 which is used in both send and receive modes. In the receive mode the antenna 40 picks up signals from the node and passes them to receiver 42 via coupler 41. Receiver 42 performs all the usual receiver functions and it passes the demodulated and regenerated traffic to common interface 47 via line 46. Receiver 42 also recovers a clock from the incoming signal and the clock passes, on line 45, to interface 47. In the send mode transmitter 44 is connected to antenna 40 via burst switch 43 and coupler 41. The transmitter obtains its data from interface 47 via line 51. Burst switch 43 is controlled from the interface via line 48. The burst switch 43 is normally open and in this orientation the signal from the transmitter does not reach the antenna 40. When closed, burst switch 43 allows the signal to reach the antenna 40 whence it is radiated to the node.

Interface 47 is adapted to contain terminal cards 50A to 50E each of which handles the traffic for one customer (and each customer has one card). Because the terminal cards 50A-50E are connected to interface 47 each receives all the signal and a clock. Each can provide traffic for transmission and control burst switch 43.

(Card 50A, as well as serving its customer, also acts as an outstation card to provide radio information to the node and to receive control signals for any radio functions controlled from the node).

The identity of each card is (adjustably) hard wired as part of interface 47. Thus all cards are identical and, in case of a fault, an old card can be removed and a new card inserted.

Figure 4:
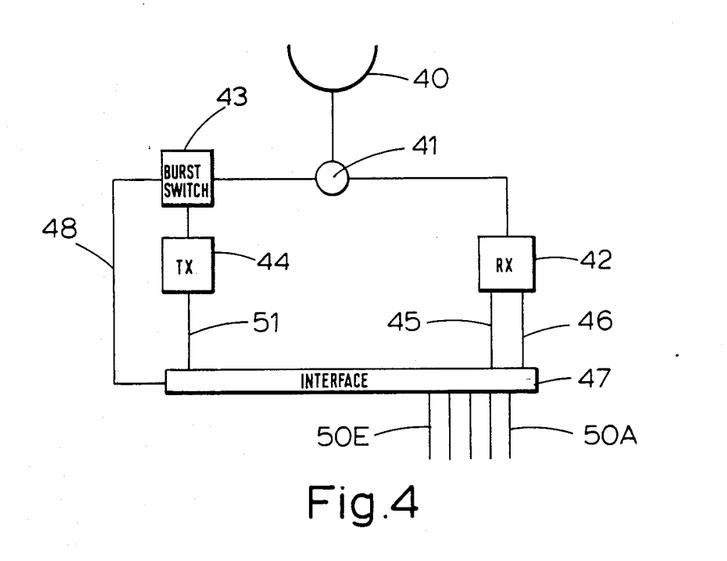
FIG. 4 is a diagram of an outstation.

Each terminal card 50 is connected to its customers equipment but these connections are not shown in FIG. 4.

Figure 5:
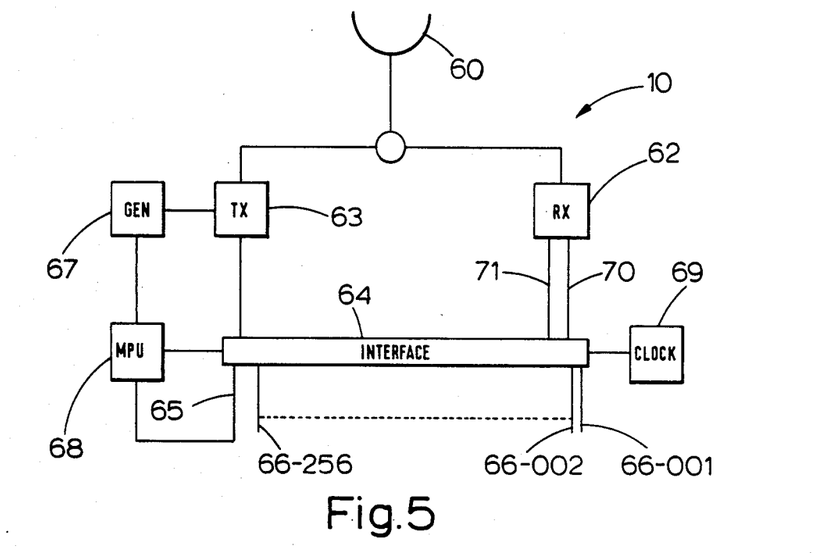
FIG. 5 is a diagram of the node.

As shown in FIG. 5, the node comprises an antenna 60 which is used in both send and receive modes. In the receive mode it picks up signals from all the outstations and passes them to receiver 62 which demodulates and regenerates the data which is passed to the common interface 64 on line 70. The receiver 62 also derives a clock from the received signal and this derived clock is passed to interface 64 on line 71.

Traffic for transmission passes from the interface 64 to transmitter 63 and then to antenna 60.

Since the node handles traffic for all the customers it includes terminal cards 66-001 to 66-256, i.e. one for each customer. It also includes a system card 65 for timeslot zero and a generator 67 for pseudo-random signals to fill in any gaps in transmission.

The node also includes master clock 69 and microprocessor 68.

In addition, the terminal cards 66 are connected to a telecommunications network so that traffic received by the cards 66 can be passed on to the destination. If two customers of the system wish to communicate with one another their cards are interconnected via the telecommunications network.

All signals related to system information are handled via the microprocessor 68. It should be noted that the microprocessor 68 has direct control of system card 65 and all the terminal cards 66. Microprocessor 68 also has control, via system card 65 and the radio, of all the idle cards (i.e. cards receiving in timeslot zero) at all the outstations.

Figure 6:
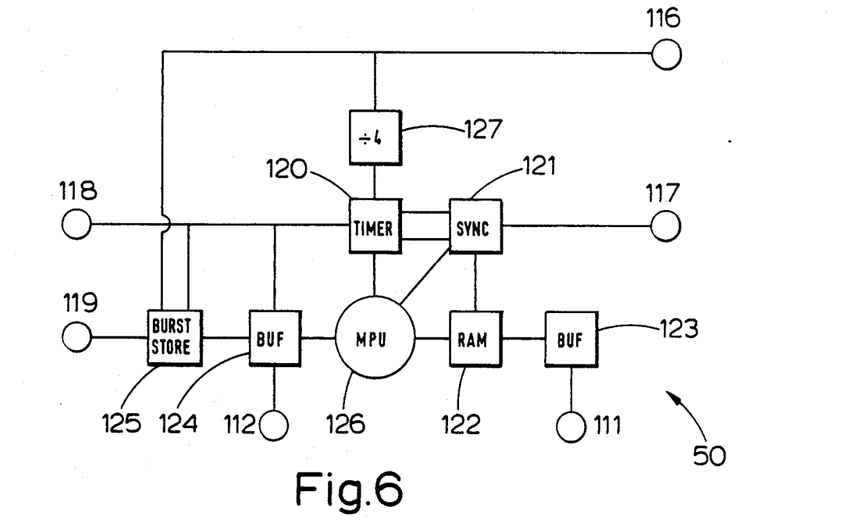
FIG. 6 is a block diagram illustrating the major functions of the cards included in FIGS. 4 and 5.
Figure 7:
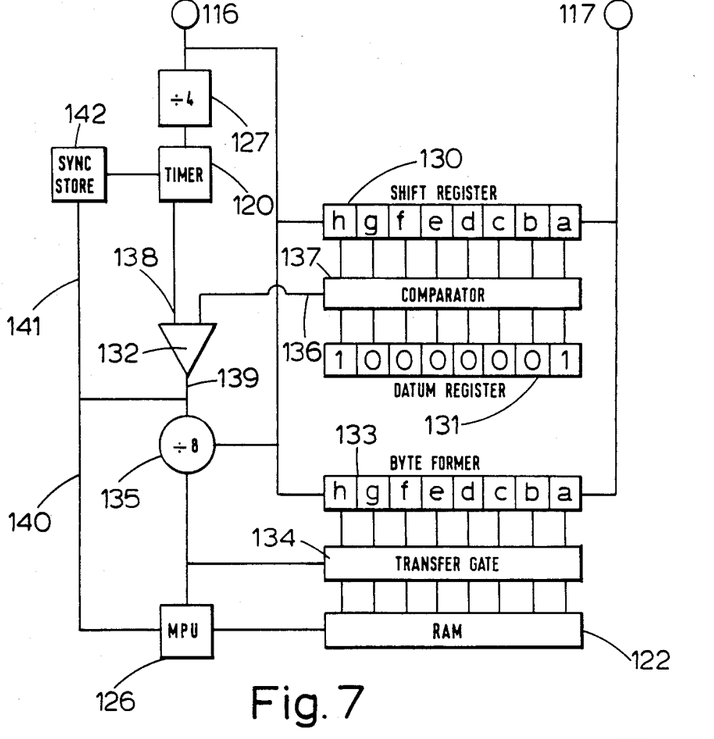
FIG. 7 is a block diagram showing the synchronisation function in greater detail than FIG. 6.

An interface circuit (card) adapted to co-operate with the transmitter and receiver of an outstation as shown in FIG. 4 is illustrated in FIGS. 6 and 7. The interface circuit is identified as the cards 50 of FIG. 4.

The card has ports 116 and 117 to accept input from the receiver and ports 118 and 119 to provide output and control to the transmitter. The card also has input port 112 and output port 111 providing terminals for a line for a single customer. The card is an interface circuit because ports 116, 117, 118 and 119 provide access to the common system and ports 111 and 112 provide access to a single customer.

More specifically ports 116-119 provide connection for the following functions:
Port 116 to receive clock signals from line 45;
Port 117 to receive data (i.e. traffic) from line 46;
Port 118 to control burst switch 43; and
Port 119 to provide data (traffic) to line 51.

As shown in FIG. 6, synchronisation means 121 is connected to accept data from port 117. Port 116 is connected to a frequency divider 127 which outputs one pulse for each four pulses received. The output of frequency divider 127 is connected to a timer 120. The data is composed into bytes which are stored in RAM 122. Once per frame the bytes are transferred to buffer 123 which makes output available at suitable speed at output port 111.

Data is received at input port 112 and held initially in buffer 124. Once per frame the data is composed into bursts by transfer to burst store 125. Timer 120, at the correct point in its cycle, actuates burst store 125 which puts a control signal to port 118 and sends data to port 119. Burst store 125 is also connected directly to port 116 so that the rate of transmission is directly controlled at system speed by the clock signal before frequency division. When the data burst is finished the signal to port 118 is removed. Microprocessor 126 not only provides general supervision but also enables the card to perform ancillary functions and to exchange between various modes of operation, e.g. traffic mode, idle mode and search mode.

During use, timer 120 receives a clock signal which takes the form of one pulse per four bits, i.e. two pulses per byte. Thus a frame (i.e. 64000 bits) lasts for 16000 clock pulses. The timer 120 counts modulo 16000, i.e. it runs from count 0 to count 15999 and then it returns to zero. Timer 120 is actuated by the clock signal from frequency divider 127 (derived from the signal received at port 116). As mentioned above, the primary time signal is recovered from the signals transmitted by the node and, therefore, the time signal runs at the speed of the system. Thus the period of timer 120 is synchronised to the frame period but it is still necessary to synchronise the phase. The frame structure, in so far as it affects this synchronisation, will now be described in greater detail. The frame consists of slot zero with 1120 bits or 280 time counts and, in accordance with demand, up to 60 traffic slots each of 1048 bits or 262 time counts. Thus the third slot starts at time count 1066.

In perfect synchronisation timer 120 is adjusted so that its own count zero corresponds to the zero count of its own slot, e.g. if it is assigned to the slot commencing at frame count 1066 the zero count of the timer occurs at count 1066 of the frame. The card uses the synchronisation marker, i.e. byte 81, which occurs in the slot to control its synchronisation function so that synchronisation errors do not accumulate. It is emphasised that the card utilises only information in its own slot; there is no need to refer to slot zero or other traffic slots. Each active clock is phase synchronised to its own slot whereby each active clock has its own characteristic phase and it is these phase differences which produce the overall synchronisation of the system.

That part of the card concerned with synchronisation and data capture is illustrated in FIG. 7. The following items mentioned above are repeated in FIG. 7:
Port 117 for receiving data from the receiver
Port 116 for receiving clock signals from the receiver
Frequency Divider 127
Timer 120
Microprocessor 126, and
Random Access Memory 122.

The synchronisation means comprises a shift register 130 having 8-bit capacity which receives data, via port 117, bit-by-bit. Shift register 130, which therefore holds the most recent 8-bits received, is linked to datum register 131 via bit comparator 137. Bit comparator 137 is connected as one input to enable-gate 132 the other input of which is from timer 120. The enable-gate 132 performs an "AND" function in that it gives output if, and only if, both inputs are active. Data from port 117 also passes to byte former 133 (which takes the form of a shift register of 8-bit capacity.) and octave counter 35 which is connected to the output of the enable-gate 132. Byte former 133 is connected to RAM 122 via transfer enable-gate 134 for bit parallel transfer of bytes. This transfer is controlled by octave counter 135 and microprocessor 126.

There are three items in FIG. 7, namely shift registers 130 and 133 and octave counter 125, which relate to the incoming data stream. Therefore these three items are required to operate a system speed and they are connected directly to port 116 whereby they receive clock signal before frequency division.

It is emphasised that the shift function of registers 130 and 133 is controlled by a clock input; i.e. the register shifts and takes in a new bit for each clock pulse it receives. This is important when using "non-return to zero" signals because the input on port 112 may remain in the "1" state for three periods and the shift registers will still correctly acquire three "1" bits because they are actuated three times by the signal from port 116. The octave counter 135 conveniently takes the form of a frequency divider giving one output for each eight inputs, i.e. it receives one input for each bit and gives one output for each byte. Octave counter 135 receives synchronisation signals on line 139 from enable means 132.

The operation of the synchronisation in a traffic slot will now be described. Datum register 131 contains the traffic sync byte 81 (i.e. 10000001) and, ideally, the timer 120 is phase synchronised so that its zero count occurs at the start of its time slot as described above. As data arrives via port 117, it passes into shift register 130 and the contents of the shift register are continuously compared with the contents of datum register 131. Therefore whenever the sequence 10000001 occurs in the data, comparator 137 produces an output on line 136. 10000001 is chosen as synchronisation byte because coincidence only lasts for one bit whereby the output on line 136 remains for the duration of one bit less the reaction time of shift register 130 and datum register 131.

It must be appreciated that the sequence 10000001 also arises as the sync byte 81 in every other traffic slot. In addition, byte 81 may also be included in traffic itself and, furthermore, the end of one byte together with the beginning of the next may also generate the sequence. The result is that although the correct synchronisation signal appears on line 136, there are also (many) spurious signals at the wrong time. The spurious signals are disabled by enable-gate 132.

Timer 120 provides an enable signal on line 138 and said signal is present during a window that commences at time count 5 and terminates at count 10. Only one synchronisation byte occurs during this window because the signal immediately before is bit synchronisation (which does not include the sequence 81) and the signal immediately after is system information which is preferably used for addresses which can be allocated so as to avoid an undesirable sequence. The synchronisation which occurs within the window causes enable-gate 132 to provide an output but the spurious signals occur outside the window and produce no such output because line 138 is not activated. Thus enable-gate 132 produces a synchronisation signal on the last bit of the sync-byte (which, ideally, occurs at count 8 of the cycle of timer 120) and this signal passes on lines 139, 140 and 141 to octave counter 135, microprocessor 126 and synchronisation store 142. On activation synchronisation store acquires and holds the current count of timer 120. A stored value of 8 indicates that the phase is correct. Lower values, e.g. 3, indicate that the phase is early whereas higher values, e.g. 13, indicate that the phase is late. At a later stage in the frame, e.g. after burst transmission, the microprocessor 126 accesses store 142. This gives the microprocessor a record from which phase error is deduced. At a suitable point in the frame, e.g. time count 12000, microprocessor 126 adds (or subtracts) a suitable value to the timer count. For example, if register 142 holds 3, the microprocessor adds 5 to give the correct value of 8; if the value is 13 then 5 is subtracted. Whilst it is possible to utilise the signal on line 141 to set the timer count to 8, it is preferred to use an indirect microprocessor setting because the latter is more flexible. The microprocessor can base its corrections on systematic errors over a few frames which reduces the chance of making an erroneous correction. In addition the microprocessor can use the same mechanism to change slots. Thus to change from slot zero to that beginning at frame count 1066 the microprocessor adds 1066 to the timer count. To return to slot zero it adds 14934.

The signals on lines 139 and 140 initiate data capture by setting the phase of octave counter 135 and actuating microprocessor 126. The arrangements for data capture, as shown in FIG. 7, include byte former 133 which is an 8-bit shift register receiving data from port 117. Byte former 133 is controlled in an 8-bit cycle by octave counter 135 so that its contents are transferred in bit-parallel form to RAM 122. Counter 135 also triggers microprocessor 126 which is thereby enabled to place the transferred byte in a correct address in RAM 122. Microprocessor 126 also counts that the correct number of bytes is transferred. It will be apparent that the arrangement illustrated provides simple data capture in which a bit stream is divided into bytes and the bytes are suitably stored. Satisfactory operation is predicated upon correct synchronisation, to the exact bit, of the cycle so that transfer occurs between the last bit of each byte and the first bit of the next. The signal on line 139 occurs on the last bit of the last byte of preamble so the signal correctly sets the phase of octave counter 139. In addition the signal on line 140 initiates the count of transferred bytes in the microprocessor 126.

The basic features of the operation of the synchronisation have been described and it is necessary to comment upon some properties thereof. The frequency of timer 120 is determined by the clock signal from port 116 but this signal has a period of four bits. Therefore the phase synchronisation cannot be better than ±2 bits. This is not adequate for data capture and, as explained above, this synchronisation is controlled directly from the sync byte. The second major synchronisation relates to burst transmission since too great a departure from the standard would cause bursts to overlap resulting in loss of reception. To avoid this nominal 4 byte gaps are left between bursts so that synchronisation errors up to ±2 bytes do not cause failure. The phase synchronisation described above is sufficiently accurate for this purpose.

The description given above applies to operation in a traffic slot but the synchronisation in slot zero is the same except that datum register 131 holds the frame synchronisation byte 01111110 and microprocessor 126 operates a different program. Change over from slot zero to traffic slot, and vice versa, only requires replacement of the content of datum register 131, adjustment of timer 120 as described above and the switch of the microprocessor into a different loop.

The system also requires a search mode for use before any synchronisation is first established or whenever synchronisation is lost. In the search mode all functions (except the search) are inhibited, datum register contains 01111110 and enable-gate 132 is continuously enabled.

Thus all occurrences of the unique frame word 7E produce signals on lines 139, 140 and 141 whereby a record of the timer counts is obtained. There may, probably will, be spurious occurences of the sequence 01111110 in the signal and these complicate the process. However the spurious occurences are not periodic and the slot-zero byte can be located by its periodic occurence over a few frames. This enables the timer to be reset in phase with slot zero. It is desirable to wait two or three frames to confirm that synchronisation is established. At this point normal operation (in the idle mode) is achieved.

The above description employs single synchronisation bytes. There is a difficulty in such operation because interference can corrupt the sync byte and hence lose one frame because enable-gate 132 would not produce the initiation signal. The repetition of the sync-bytes reduces the frequency of this failure. It is preferred to use three repetitions, i.e. 818181. Thus in normal operation and without interference, enable-gate 132 will give three signals and the data capture will be re-started twice. The double repetition also means that the "normal" value retained in synchronisation store 142 is 12 (synchronisations on counts 8 and 10 being overwritten). With this method of operation, synchronisation and data capture will still function even if two of the three sync-bytes are obscured by interference. It will be apparent that, when interference affects synchronisation, the first (or first two) bytes in the captured data will be corrupt sync bytes. The data contains check sums which enable the microprocessor to ascertain which bytes constitute the data. This also determines which synchronisation was utilised and hence which count, namely 8, 10 or 12, should appear in synchronisation store 142. Thus the phase error, if any, can be determined and the correction loop can perform as normal.

It is convenient to separate the functions of the card into four quadrants. In quadrant one, the card performs synchronisation and data capture. For a slot length of 1048 bits, data capture is complete by timer count 262. Quadrant one lasts until count 4000 so there is plenty of time to perform checks before the end of the quadrant.

Quadrant two lasts for 4000 counts minus the correction for transmission delay. (The period of the clock counts is about 6.25 μs during which time a radio wave travels about 1800 m for a single journey or 900 m for a double journey. This constitutes a delay which is corrected by transmitting the burst early from the outstation. The delay is about 1 timer count for each kilometer of range from the node). Microprocessor 126 stores the range delay and sets the timer to 4000 minus the range delay. During quadrant two, microprocessor 126 acquires the data held in buffer 124 and forms a burst by concatenating (preamble+system information+data from buffer 124) and placing said burst into burst store 125. At the end of quadrant two, burst store 125 is activated so that it places a control signal on port 118 and outputs its contents (at 6.4 Mbits/s) to port 119. After activation burst store 125 operates independently so that microprocessor 126 is released for other tasks.

Quadrant three lasts for 4000 counts plus the range delay (which means that quadrant three ends at count 12000 of the whole cycle). During quadrant three the microprocessor performs "housekeeping tasks", e.g. it acts on any systems information which has been received, it corrects the range delay in accordance with signals from the node and it computes, and if necessary, implements phase corrections to timer 120.

Quadrant four lasts for 4000 counts. Traffic received from the node and held in RAM 122 is passed to buffer 123 for output to port 116. At the end of quadrant four the card is ready for quadrant one.

The description above relates to an outstation, but the node also contains cards which perform the same functions and communication is between a pair of cards which utilise and control the transmitters and receivers for this purpose. The node includes a master clock and a supervisor, i.e. a microprocessor which controls the system as a whole. In particular the supervisor controls all transmissions from the node to ensure that they occur at the correct time and in the correct sequence. To achieve this the card shown in FIG. 6 has alternative connections (not shown) whereby a signal from the supervisor actuates burst store 125 to initiate transmission and output to port 119 is controlled by the node's master clock (instead of a recovered clock from port 116). The control of timer 120 is also modified so that said signal sets timer 120 to count 8000. The timing signal from the master clock is provided to timer 120 which therefore runs at correct speed and phase under direct control of the supervisor.

Since synchronisation at the outstation may be imperfect, quadrant one at the node is identical to quadrant one at the outstation as described above. Phase errors, computed from the time count retained in synchronisation store 142, indicate error in the range delay used at the outstation. These errors are returned to the outstation as system information and used to adjust the end of outstation quadrant two.

Connections on the cards are preferably provided in the form of plug-and-socket. Thus ports, 111, 112, 116, 117, 118 and 119 are provided in this way. Other services, e.g. power supply are also provided. Ancillary functions, e.g. an address to designate the customer may also be supplied via the plug-and-socket. At the node this facilitates the use of one card per slot (as opposed to one card per customer) since the supervisor can change the address as needed.

Thus the card provides all the functions relevant to a time-slot and, as all cards are the same, replacement of a faulty card is facilitated.

Figure 8:
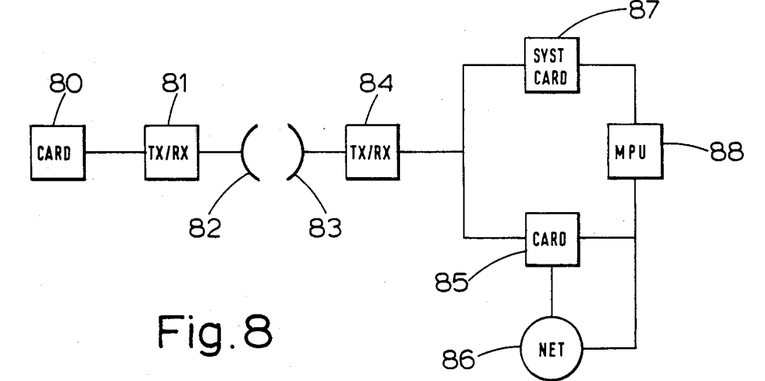
FIG. 8 is a diagram of a simple circuit relating to a single user.

The operation will be further described, with reference to FIG. 8, by a new customer. The circuit relevant to this customer comprises terminal card 80 connected for two-way communication with outstation transmitter/receiver 81 which radiates to the node via antenna 82. The node includes terminal card 85 (which is the counterpart of card 80). Card 85 is connected for two-way communication with node transmitter/receiver 84 and antenna 83. Thus two-way communication is possible between cards 80 and 85. Card 85 is also connected to telecommunications network 86. Also relevant to card 80 are system card 87 and microprocessor 88. Microprocessor 88 is also connected to network 86 so that it can set up calls on behalf of the customers (which includes card 80).

On its first insertion card 80 obtains its address from the interface of the outstation. It contains a microprocessor with general information about the system and shift required for handling the signals. On first becoming live card 80 scans the whole of the reception for the preamble for timeslot zero, i.e. it looks for the sequence:

AAAA7E7E7E and zeros its clock on this sequence when located.

When a sufficient time has elapsed, microprocessor 88 causes system card 87 to transmit to card 80 a request for a ranging timeslot as described above. Card 80 complies with this request using a standard delay incorporated into all new cards. System card 87 times the return and measures the error. This enables microprocessor 88 to calculate the correct delay for card 80 and this is returned to card 80 via system card 87. Card 80 can now store and use a delay measured so that its bursts are in correct synchronisation when received at the node. With its delay adjusted card 80 is able to take part in the normal operation of the system.

To institute a call, card 80 sends a signal using a calling slot as described above. This is received by system card 87 and the request is passed to microprocessor 88. If there is an empty slot microprocessor 88 communicates the start time of said slot to card 80 via system card 87. On receiving this confirmation card 80 re-zeros its timer to the new start time and enters the traffic mode. Microprocessor 88 also places card 85 into the same slot also in the traffic mode.

At this time the synchronisation for traffic is established. Primary synchronisation is ensured by the node which causes card 85 to transmit traffic preamble on schedule. (Traffic preamble comprises: AAAAAA818181+system ID+ID of card 80).

Card 80 has received timing information and its clock is synchronised to the transmission of card 85. It recognises the preamble and if its clock is in error this is corrected. After the delay, established as described above, card 80 returns a burst to card 85. This burst arrives at the node in correct order and timing. The burst from card 88 includes preamble so that card 85 can check timing. The traffic slot contains room for a "message" (bytes 9-16) and this can be used by the node to correct the time delay if necessary. Thus the synchronisation established initially can be retained throughout a call. Thus the first step establishes traffic communication, in a suitable slot, between cards 80 and 85. It is also necessary to establish communication through network 86. Card 80 uses the "message" space in bytes 9-16 to communicate to microprocessor 88, via card 85, the phone number it wishes to call. Microprocessor 88 uses this information to complete the call in network 86.

At the end of the call card 80 uses the "message" to inform card 85 and hence microprocessor 88 which terminates the call.

In a modification (not illustrated) the traffic slots are varied in length to suit the demands of the customers. In this modification microprocessor 88 has to inform cards 80 and 85 of the length of the traffic slots as well as the start time.

It is emphasised that using preamble in each slot provides accurate synchronisation in each slot even though, because the system is scattered at substantial distance, there are substantial phase differences between the slots. In accordance with conventional practice it is desirable to scramble the signal but it is important that the preamble be recognised and, therefore, preamble should not be scrambled. The preambles disclosed in this specification were chosen so that scrambling would not confer any advantage.

In the description above it has been assumed that a "byte" contains eight bits because eight is the standard and conventional length for telecommunications (and other) technology. It will be apparant that the invention works equally well with "bytes" of other lengths.

We claim:

1. A communication system comprising a single node and a plurality of outstations arranged for communication using two communication channels, one of said communication channels being used for communicating signals from the node to all of the outstations, the other of said communication channels being shared by all of the outstations, wherein said communcation takes the form of traffic bursts within successive frame periods, each burst including a marker signal for synchronization wherein the node includes a plurality of burst extraction means for extracting respective selected bursts from received signal frames;

wherein the outstations each include at least one burst extraction means for extracting respective selected bursts from received signal frame; and wherein each burst extraction means includes frame synchronization means responsive only to the marker signals within its respective bursts.

2. A system according to claim 1, wherein each marker signal takes the form of preamble transmitted at the start of its burst, said preamble comprising
    (a) bit synchronisation followed by;
    (b) byte synchronisation.

3. A system according to claim 2, wherein the marker signals of bursts transmitted from node to outstations include the address of the destination and the marker signals of bursts from outstations to node include the address of the origin.

4. A system according to any one of claims 1, 2 or 3 wherein the outstations include means for initiating a pre-set delay on receipt of a burst from the node and means for returning a burst to the node at the end of said pre-set delay.

5. A system according to claim 4 wherein the node includes:
    (a) means for checking the synchronization of received bursts;
    (b) means for producing error signals indicating the extent of any errors; and
    (c) means for transmitting said error signals to the originating outstations.

6. A system according to claim 5 wherein the outstations include means for changing their standardised delays in accordance with received error signals whereby the node keeps correct synchronisation of its received signals.

7. A system according to claim 1, wherein the node includes means for transmitting a system burst, said burst including identification which distinguishes said burst from all other bursts.

8. A system according to claim 7 wherein said identification takes the form of distinctive byte synchronisation.

9. A system according to claim 1, wherein each burst lasts between 1 µs and 1 ms.

10. A system according to claim 1, wherein the node includes transmitting means for transmitting a frame which consists of a slot for a system burst followed by between 2 and 2000 slots for traffic bursts.

11. A system according to claim 1, wherein the two communication channels take the form of radio channels of distinct frequencies.

12. A node for use in a communications system comprising a single node and a plurality of outstations arranged for communication using two communications channels, one of said communications channels being used for communication from the node to the outstations, the other communications channel being shared by the outstations, said node comprising:
    (a) means for receiving traffic for a plurality of outstations and dividing said traffic into portions suitable for transmission in a single burst;
    (b) means for producing bursts by combining said traffic portions with synchronization marker signals;
    (c) means for transmitting said bursts within successive frame periods in sequence to said plurality of outstations;
    (d) means for receiving signals originating from said plurality of outstations, said signals being in the form of bursts wherein each burst within successive frame periods includes synchronization marker signals;
    (e) a plurality of burst extraction means for selecting respective bursts from received frames, each extraction means including frame synchronization means responsive only to the marker signals within its respective bursts for synchronizing the said extraction to the receipt of said marker signals.

13. A node according to claim 12, which also includes means for comparing the times of arrival of received bursts with a specified schedule therefor and producing error signals indicative of discrepancies there between and means of transmitting said error signals to the outstations.

14. A node for use in a communications system comprising a single node and a plurality of outstations arranged for communication using two communications channels, one of said communications channels being used for communication from the node to the outstations, the other communications channel being shared by the outstations, said node comprising:
    (a) a transmitter for transmitting to a plurality of outstations;
    (b) a receiver for receiving from said plurality of outstations;
    (c) a plurality of terminal cards, each adapted to handle the traffic in a single slot, each of said cards being connected (i) to receive demodulated data from the receiver and (ii) to pass data for transmission to the transmitter;
    (d) a single system card, also connected to the receiver and the transmitter; and
    (e) supervisory means adapted to control the operating sequence of the terminal cards and the system card wherein the supervisory means is connected to the system card whereby the supervisory means can send system information and instructions to the outstations and also wherein each terminal card comprises:

(c) (i) means for receiving traffic for its slot and dividing said traffic into portions suitable for transmission in a single slot;

(c) (ii) means for producing bursts by combining said traffic portions with synchronization marker signals comprising bit synchronization and byte synchronization;

(c) (iii) means for passing said bursts to the transmitter for transmission of traffic bursts within successive frame periods;

(c) (iv) means for receiving demodulated signals from the receiver, said signals being in the form of bursts within successive frame periods, wherein each burst includes synchronization marker signals;

(c) (v) timing means synchronizable with the frame period and adapted to actuate means (c) (iv) to operate in a pre-set phase of its own cycle;

(c) (vi) means for recognizing the said marker signals within the received bursts for each slot and in resonse thereto to adjust the set point of the timing means so that the marker signal occurs at the correct phase of the cycle of the timing means.

15. An outstation for use in a communications system comprising a single node and a plurality of outstations arranged for communication using two communications channels, one of said communications channels being used for communication from the node to the outstations, the other communications channel being shared by the outstations, said outstation comprising:

(a) means for receiving signals for a node, said signals taking the form of bursts within successive frame periods, wherein each burst includes synchronization marker signals;

(b) timing means for identifying its own slot and selecting bursts contained therein;

(c) means for receiving traffic for the node and dividing said traffic into portions suitable for transmission in a single burst;

(d) means for producing bursts by combining said portions with synchronization marker signals;

(e) means for transmitting said burst within successive frame periods to the node;

(f) frame synchronization means responsive to marker signals within the said selected bursts for synchronizing said signal receiving means, timing means, traffic receiving means, burst producing means, and transmitting means.

16. An outstation according to claim 15 which includes:

(a) a clock adapted to measure a pre-set delay;

(b) means to initiate said clock on receipt of a preamble in its own slot;

(c) means to initiate transmission means specified in part (e) of claim 15 when said clock ends the measure of the pre-set delay.

17. An outstation according to claim 16, which also includes:

(a) means for for receiving error signals relating to the pre-set delay specified in part (a) of claim 16, and (b) means for adjusting said pre-set delay in accordance with said error signals.

18. An outstation for use in a communications system comprising a single node and a plurality of outstations arranged for communication using two communications channels, one of said communications channels being used for communication from the node to the outstations, the other communications channel being shared by the outstations, said outstation comprising:

(a) a transmitter for transmitting to the node;

(b) a receiver for receiving from the node;

(c) one or more terminal cards, each adapted to handle the traffic in a single slot, each of said cards being connected to the receiver and the transmitter wherein each terminal card comprises:

(c) (i) means for receiving traffic for transmission in its slot and dividing said traffic into portions suitable for transmission in a single slot;

(c) (ii) means for producing bursts by combining said traffic portions with synchronization marker signals comprising bit synchronization and byte synchronization;

(c) (iii) means for passing said bursts to the transmitter for transmission of traffic bursts within successive frame periods;

(c) (iv) means for receiving demodulated signals from the receiver, said signals being in the form of bursts within successive frame periods, wherein each burst includes synchronization marker signals;

(c) (v) means for recognizing bursts containing the address of a user and passing on traffic contained in bursts so identified;

(c) (vi) timing means synchronizable with the frame period and adapted to activate means (c) (i) and (c) (iv) in correct sequence and at pre-set phases in its own cycle;

(c) (vii) means for recognizing the said marker signals within the received bursts for its slots and to adjust the set point of the timing means in response to said recognized marker signals so that the marker signal occurs at the correct phase of the cycle of the timing means.

19. Interface circuit for performing send-and-receive functions of a telecommunications station so as to synchronise said function with a specified slot of time multiplexed operation between a single node and a plurality of terminals, characterised in that the interface circuit comprises:

(a) enable means having first and second inputs and an output for synchronisation signals;

(b) comparator means adapted to receive signals and connected to the first input of the enable means;

(c) a cyclic timer adapted to receive a clock signal and to control the said send and receive functions to occur at preset phases of the cycle of the timer, said timer being connected to the second input of the enable means;

(d) data capture means for receiving and retaining signal and operatively connected to receive synchronisation signals from the output of the enable means, said data capture means being adapted to initiate a data capture sequence on receipt of each synchronisation signal;

(e) synchronisation means connected to receive synchronisation signals from the output of the enable means, said synchronisation means being adapted to produce an error signal measuring the discrepancy between the phase of the timer at which the synchronisation signal occurs and the predetermined phase of the cycle of the timer at which the synchronisation signal is supposed to occur;

wherein:
(i) said comparator means is adapted to compare received signal with a datum and to provide a coincidence signal to said first input of said enable means upon coincidences of said received signal with said datum, and
(ii) said timer is adapted to define a synchronisation window and to provide an enable signal on said second input of said enable means during said time window;
whereby the occurence within the time window of coincidences between the signal and the datum causes the enable means to provide a synchronisation signal.

20. An interface according to claim 19, wherein the comparator means comprises a shift register for received signals, a datum register for holding the datum and a bit comparator for comparing each bit of the shift register with the corresponding bit of the datum register and producing the coincidence signal when all bits match.

21. An interface according to claim 19, wherein the data capture means comprises a shift register which is adapted to receive data in bit serial form and transfer means adapted to transfer said data to random access memory in bit parallel form using a transfer cycle having a period equal to the number of bits in a byte, said transfer means being connected to the enable means in such a manner that the reception of a synchronisation signal adjusts the phase of the transfer cycle so that the signal bit following the synchronisation signal is the first of a new byte.

22. Interface circuit according to claim 19 which also comprises a burst generator for providing signal bursts for transmission, wherein said burst generator is operatively connected to the timer for the initiation of bursts at a preset phase of the timer.

23. Interface circuit according to claim 19, which also comprises means for changing the operating slot of the interface, said means comprising means for changing the phase of the timer to correspond to the phase of the new slot and means for changing the contents of the datum store to correspond to the datum of the new slot.

24. A method of communicating signals in frames between a central transceiver and a plurality of satellite transceivers comprising the steps of:
(1) transmitting a first outward signal from said central transceiver over a first communications channel, said first outward signal including a first marker synchronization signal and also including address signals designating a first of said satellite transceivers;
(2) receiving said first outward signal with said first satellite transceiver and distinguishing said first outward signal from other outward signals in response to said address signals included therein;
(3) extracting said first marker signal from said first outward signal with said first satellite transceiver;
(4) a pre-set delay after said extracting step (3) is performed, said preset delay dependent upon on the propagation delay between said first satellite transceiver and said central transceiver, transmitting a first inward signal from said first satellite transceiver over a further communications channel;
(5) transmitting a second outward signal from said central transceiver over said first communications channel, said second outward signal including a second marker synchronization signal having a predetermined timing relationship with said first marker signal, said second outward signal also including address signals designating a second of said satellite transceivers;
(6) receiving said second outward signal with said second satellite transceiver and distinguishing said second outward signal from other outward signals in response to said address signals included therein;
(7) extracting said second marker signal from said second outward signal with said second satellite transceiver;
(8) a pre-set delay after said extracting step (7), said pre-set delay dependent upon the propagation delay between said second transceiver and said central transceiver, transmitting a second inward signal from said second satellite transceiver over said further communications channel; and
(9) receiving said first and second inward signals with said central station during respective discrete time intervals of a frame without overlap and in a predetermined sequence.

25. A system for communicating signals in a frame, said system comprising:
a central transceiver including:
transmitting means for transmitting outward signals over a first communication channel,
receiving means for receiving inward signals over a further communications channel, and
control means connected to said transmitting means and receiving means for controlling said transmitting means to transmit over said first communications channel (1) a first outward signal including a first marker synchronization signal and address signals designating a first satellite transceiver and (2) a second outward signal including a second marker synchronization signal having a predetermined timing relationship with said first marker signal and including address signals designating a second satellite transceiver;
a first satellite transceiver including:
receiving means for receiving said first outward signal and for distinguishing said first outward signal from other outward signals in response to said address signals included therein,
extracting means, connected to said receiving means, for extracting said first marker signal from said first outward signal,
means, connected to said extracting means, for timing a pre-set delay dependent on the propagation delay between said first satellite transceiver and said central transceiver beginning at the time said first marker signal is extracted, and
means, connected to said timing means, for transmitting a first inward signal over said further communications channel beginning at the time said delay timed by said timing means has elapsed; and
a second satellite transceiver including:
means for receiving said second outward signal and for distinguishing said second outward signal from other outward signals in response to said address signals included therein,
extracting means, connected to said receiving means, for extracting said second marker signal from said second outward signal,
timing means, connected to said extracting means, for timing a pre-set delay dependent on the propagation delay between said second satellite transceiver and said central transceiver beginning at the time said extracting means extracts said second marker signal, and transmitting means connected to said timing means for transmitting a second inward signal over said further communications channel beginning at the time said delay timed by said timing means has elapsed, wherein said central transceiver receiving means receives said first and second inward signals during discrete, sequential non-overlapping time intervals in a frame.

* * * * *